Aug. 28, 1962 — C. H. COLLETT — 3,051,532
WELL PIPE PROTECTOR
Filed Nov. 20, 1958 — 2 Sheets-Sheet 1
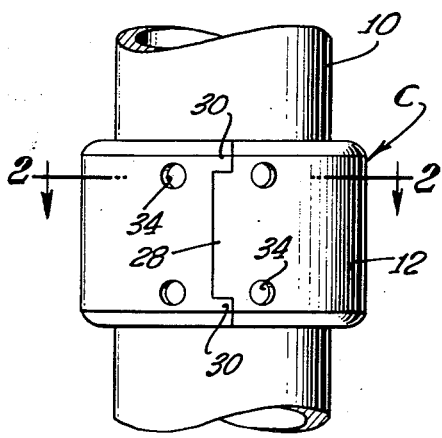
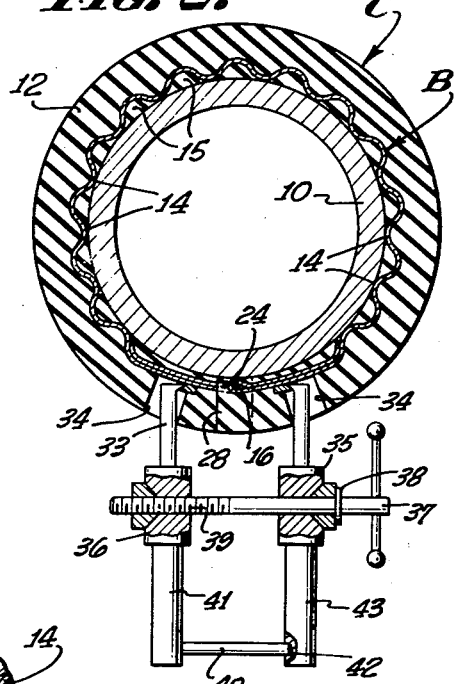
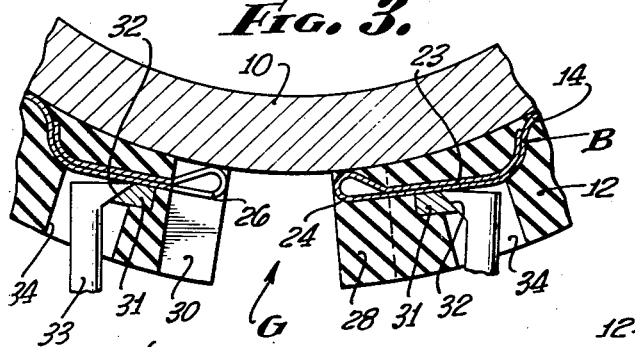
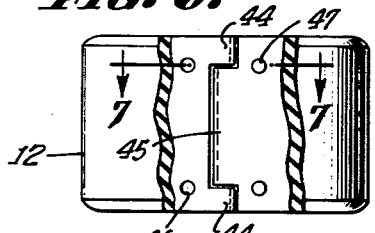
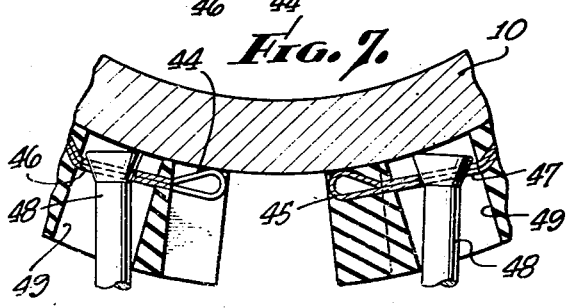
INVENTOR.
CHARLES H. COLLETT
BY White & Haefliger
ATTORNEYS Aug. 28, 1962  C. H. COLLETT  3,051,532
WELL PIPE PROTECTOR
Filed Nov. 20, 1958  2 Sheets-Sheet 2
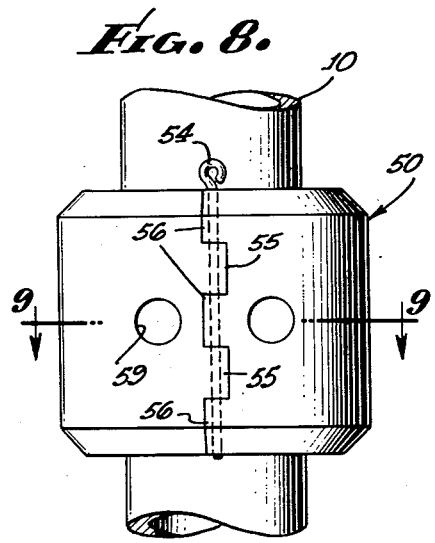
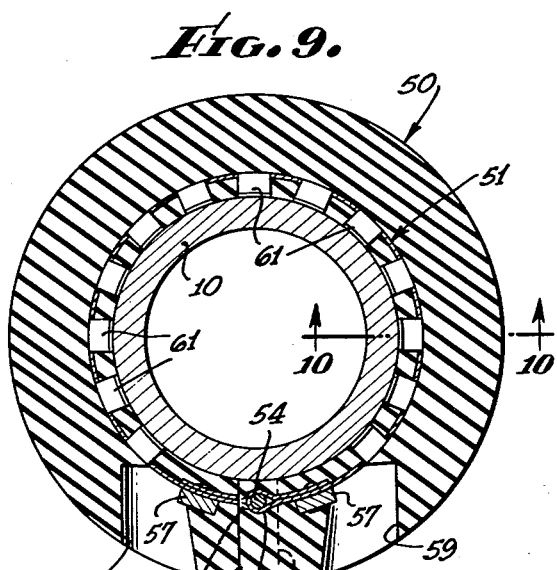
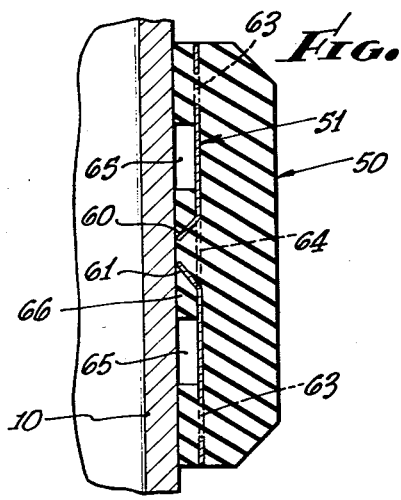
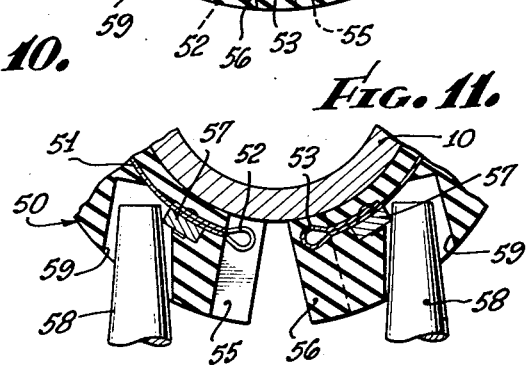
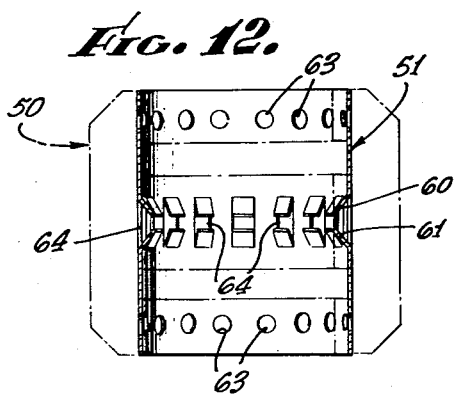
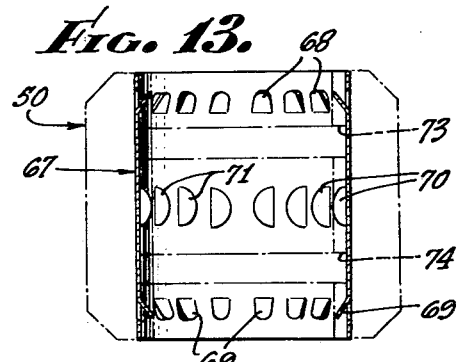
INVENTOR.
CHARLES H. COLLETT
BY
ATTORNEYS.

United States Patent Office 3,051,532
Patented Aug. 28, 1962

3,051,532
WELL PIPE PROTECTOR
Charles H. Collett, 4116 Riverside Drive, Burbank, Calif.
Filed Nov. 20, 1958, Ser. No. 775,182
11 Claims. (Cl. 308—4)

This invention relates to improvements in well pipe protectors of the general type comprising an elastomeric body applicable to rotary drill pipe to prevent metal-to-metal contact and excessive wear of the drill pipe and casing.

In certain of its specific aspects, the invention is particularly concerned with such protectors which are of split formation rendering them capable of lateral, as distinguished from axial slip-over, application to the pipe.

The usual drill pipe protector collars or sleeves have been made in the form of a tubular rubber body externally sized to be larger in diameter than the tool joints, and having and relying upon rubber-to-metal contact with the pipe to hold the protector in place. Because of low coefficients of friction between between engaged rubber and metal surfaces, reliance has been placed upon stretching, or circularly tensioning the rubber protector body about the pipe to resist relative movement of the applied protector. Common experience has been that under the severe conditions of usage in wells, the usual protector sleeves tend to become displaced along the pipe away from the tool joints to be protected, and sometimes to become stripped from the pipe.

My primary and general object is to incorporate in elastomeric well pipe protector sleeves, metallic means directly engageable with the pipe surface to provide metal-to-metal contact capable of fixing the protector in its applied position more securely, and particularly over prolonged usage, than can be achieved by conventional protectors. And in this regard, the invention contemplates so securing the protector to the pipe that the retaining grip will remain independently of loss of elasticity or tension in the rubber body.

The invention further contemplates embodiment of these features in split sleeve forms of protectors having the additional advantages of greater ease and convenience in their application to the pipe, and all in a manner whereby the metal pipe engaging or gripping means is brought into fixed bearing against the pipe in the operation of applying and closing the protector body about the pipe. Here the band serves an additional important purpose as a strong, resiliently flexible internal reinforcement for the rubber sleeve.

In its preferred embodiments, the present protector body is made to contain a metallic band preferably of spring steel, terminating at the body split and carrying pipe engaging projections at the inside surface of the rubber body. By forming both the body and band terminals with an interfitting locking relation at the body split, and by providing for accommodation of an applicator tool, all as later explained, the initially applied protector may be closed about the pipe to a locked tightness circularly tensioning both the body and metallic band so that the band projections are tightly forced and held against the pipe.

As to the forms of the metal pipe gripping means, I have shown one embodiment in which the metal band has corrugations running axially of the body and presenting exposable pipe engaging crests, and other forms, which I prefer, in which the band carries teeth or gripping dogs capable of penetrating the pipe surface to the extent necessary to fix the protector in place.

All the above mentioned as well as additional features and objects of the invention will be understood more fully and to best advantage from the following detailed description of certain illustrative embodiments shown by the accompanying drawings, in which:

FIG. 1 is a side elevation showing one embodiment of the invention installed on a drill pipe;
FIG. 2 is an enlarged transverse section on line 2—2 of FIG. 1;
FIG. 3 is an enlarged sectional fragment showing the two ends of the protector engaged by a tool for constriction about the pipe;
FIG. 4 is a section along one diameter of the protector illustrating the pin interconnection at the split ends;
FIG. 5 is a fragmentary showing of the band undulation engagement against the pipe;
FIG. 6 is a side elevation of a modified form of the protector with portions of the rubber body broken away;
FIG. 7 is an enlarged section on line 7—7 of FIG. 6 illustrating the use of an applicator tool;
FIG. 8 is a view similar to FIG. 1 showing a further variational and preferred form of the invention;
FIG. 9 is an enlarged cross-section on line 9—9 of FIG. 8;
FIG. 10 is a vertical section taken on line 10—10 of FIG. 9;
FIG. 11 is a fragmentary section showing the condition of the protector and applicator tool before tightened constriction about the pipe;
FIG. 12 is an inside showing of the band carrying the gripping dogs; and
FIG. 13 is a view similar to FIG. 12 showing a similar variational form.

FIGS. 1 and 2 show a drill pipe 10 equipped with a protective collar, generally indicated at C, which may be positioned close to a usual tool joint, not shown. The protector comprises a cylindrical body 12 of rubber or equivalent elastomeric material larger in outside diameter than the tool joint to keep the drill string from direct contact with the surrounding casing. Bonded to and embedded in the material of the body 12 is a reinforcement and pipe gripping means in the form of a spring metal band, generally indicated at B, having corrugations or undulations as shown. Typically, such a spring metal band for use on a five inch drill pipe may have thirteen uniform undulations each having a depth of about five-sixteenths inch in the unstressed configuration of the band.

The inward crests 14 of the undulations define the inner diameter of the band and may conform to the inner diameter of the body 12 being actually exposed at its inner surface. Thus, the crests 14 make tangential contact with the metal surface of the drill pipe 10 and present terminal or end surfaces 14a (see FIG. 5) which are engageable against irregularities on the pipe surface to additionally resist axial displacement of the protector thereon. The band B is integrally bonded to the rubber body 12 by molding the latter against the band and the bond may be strengthened by molding the rubber through openings O, see FIG. 4, in the band. As illustrated, the band may extend substantially the full width of the rubber body 12, although it is contemplated that the band may be of less width, and if desired, may be given other configurations which will permit the band to stretch circumferentially and remain under flexural stress to provide the desired gripping force at the crests 14 and shoulders 14a. FIG. 2 shows inner portions 15 of the rubber material within the band undulations, which are compressible against the pipe surfaces between the gripping crests 14, in the applied and tensioned condition of the band. These inner portions 15 of the rubber may be omitted in some practices of the invention, but generally they are desirable since they add to the frictional grip and allow for the presence of bonding rubber at both sides of the metal band.

The unstressed inside diameter of both the band B and body 12 preferably is less than the outside diameter of the pipe 10, and the body accordingly may be molded to the band at its unstressed configuration. When the protective collar is applied to the drill pipe as shown in FIGS. 1 and 2, both the body 12 and band B are placed under circumferential tension or hoop stress acting to press and somewhat flex or flatten the undulation crests against the pipe surface. It will be observed that while the total forces pressing the gripping ridges against the pipe include the constrictive force of the tensioned rubber, the tensioned condition of the metal band assures sustained forced engagement of the gripping crests 14 against the pipe, independently of any loss of tension or elasticity in the rubber.

While the invention may be embodied in a continuous collar which may be mounted by slipping the collar over an end of a length of drill pipe, preferably the protector is of split construction allowing it to be opened and applied laterally to the pipe. For this purpose the band B is split to form two mating ends which may be adapted for interconnection in any desired manner. Typically, the ends of the bands are interconnected and interlocked by a pin 16, see FIG. 4, having a thin flat head 18 and a shank swaged or upset to form small transverse ribs 20. For reception of the pin 16, one end of the band B is formed with a central tongue 22 terminally looped at 24 by folding back and spot welding the band at 23, see FIG. 3, and the other end of the band has two spaced tongues 25 similarly formed as loops 26 between which the tongue 22 is received when the loops are alined to receive the pin.

The two ends of the split rubber body 12 conform to the configurations of the band ends, one end of the body being formed with a central tongue 28 conforming to the band tongue 22, the other end of the body having spaced tongues 30 receiving between them the tongue 28 and conforming to the band tongues 25.

At its unstressed circumferential dimension, the protector will not quite encircle the drill pipe and substantial force is required to bring the ends together into interlocked condition. The gap at G to be closed is sufficient to cause stressing of the protector to the degree required to assure sustained effectiveness of its gripping engagement with the pipe. To illustrate, a protector sized to fit a five inch drill pipe, may present, unstressed, a gap at G of about five-eighths inch.

Any suitable tool may be used to draw the ends of the protector together, and the latter may be adapted in any suitable manner for accommodation of such a tool. As illustrative, each end of the band may be provided with welded-on metal cleats 31 extending the width of the band and presenting undercut shoulders 32 engageable by the jaws 33 of an applicator tool, inserted through openings 34 in the rubber body 12. Merely as illustrative, FIG. 2 shows the tool to comprise blocks 35 and 36 carrying the jaws 33 and actuable by shaft 37 having a flange 38 bearing against block 35 and a threaded extent 39 screwed into block 36 so that opposite rotations of the shaft spread and converge the jaws. A rod 40 carried by an extension 41 of block 36 oscillates in a socket 42 in extension 43 of block 35, to provide a fulcrumed support.

The modification shown in FIGS. 6 and 7 corresponds to the previously described embodiment, except that here the band terminals 44 and 45 are provided with openings 46 and 47 for reception of the jaws 48 of an applicator tool inserted within openings 49 extending entirely through the rubber body of the protector.

In the preferred embodiments of the invention appearing in FIGS. 8 to 13, the protector sleeve assembly, as before, comprises a rubber body 50 within which is embedded and bonded a spring steel band 51, the interfitting terminals of which are looped at 52 and 53 to receive the locking pin 54. Here I have shown one side of the rubber body to have two hinge projections 55 receivable between three mating projections 56 on the opposite end of the body, it being understood that the looped hinge terminals of the band 51 are similarly conformed. The embedded metal cleats 57 attached to the band preferably by riveting, are engageable by the arms or jaws 58 of an applicator tool received within openings 59 in the rubber, to constrict the assembly about the pipe and bring loops 52 and 53 into alinement for reception of the locking pin 54. The cleats 57, like cleats 31, serve as members that reinforce the band in the respect of assuming and distributing forces applied by the applicator tool jaws, that might otherwise deform or disrupt the band.

In this embodiment of the invention the band 51 is shown to carry or be formed with pipe gripping means in the form of dogs or teeth capable of penetrating or biting into the surface of the pipe to the extent necessary to prevent displacement of the protector sleeve in either axial direction. Referring particularly to FIGS. 10 and 12, the latter showing the inside of the metal band itself (with the rubber body configuration appearing in dotted lines), the band is shown to have near and preferably at opposite sides of its axial center, inwardly struck-out projections or dogs 60 and 61 engageable against opposite sides of the pipe at circularly spaced intervals, dogs 60 effectively facing and inclining downwardly and inwardly so as to effectively resist downward displacement of the protector, with the dogs 61 effectively facing upwardly and inwardly inclined to prevent opposite displacement of the protector. The gripping edges of the dog may be more or less sharp so that in their resistance to axial displacement of the protector they tend to bite into the pipe at their points of tangential contact. It will be noted that the pipe engaging terminals of the dogs 60 and 61 are turned inwardly and more radially of the pipe so that the edges of the dogs tend to remain in gripping and penetrating engagement with the pipe regardless of the degree of flexure of the dogs.

As will be understood, under use conditions, the gripping edges of the dogs are exposed for direct contact with the surface of the pipe, although as the protector is molded, these edges may be slightly filmed-over with rubber. In further reference to the molded form of the protector, the rubber may be bonded through circularly arranged openings 63 within and near the ends of the band 51, and through slots 64 left as a result of the metal being struck-out to form the dogs 60 and 61. Preferably the rubber is molded to leave annular recesses 65 at opposite sides of the rubber embedding the dogs at 66, so as to accommodate displacement of the rubber resulting from its compression about the pipe.

FIG. 13 illustrates a further variational form and arrangement of gripping dogs carried within the rubber protector body by a metal band 67 similar to the described band 51, except that here the metal is struck-out inwardly to form oppositely inclined gripping dogs 68 and 69 toward the top and bottom of the band to hold against axial displacement of the protector, and in addition, a centrally located arcuate series of dogs 70 angling in one direction from the circular extent of the band to prevent anti-clockwise rotation of the protector on the pipe, and a second similar series 71 of dogs which hold the protector against opposite rotation on the pipe. Displacement of the rubber embedding the dogs in response to compression about the pipe, is accommodated by annularly recessing the inside of the body at 73 and 74 between the three circular rows of the dogs.

As will be understood, when the applied protector in either of the FIG. 12 or FIG. 13 forms is applied to and tensioned to locked condition about the pipe, the gripping dogs tend by reason of the band tensioning to deflect at least slightly, and in so doing to exert their pipe gripping forces under the combined influences of the rubber body and band tensioning, the sustained gripping effectiveness of the dogs being assured independently of any loss of circular tension or elasticity in the body by reason of the locked tensioned or hoop stressed condition of the band itself. This assurance is given because the individual gripping means, i.e., the undulations, or dogs, are interconnected in and by their respective bands so that all respond against the pipe to tensioning of the bands.

Finally, it will have been observed that in all described forms of the invention the pipe engaging and gripping means, whether in the form of undulations or inwardly projecting dogs, tend to flex radially as the band is tensioned and to retain their flexed condition and consequent gripping engagement with the pipe even though some demolition of the hoop stress in the band may occur.

This application is a continuation-in-part of my copending application Serial No. 660,330, filed May 20, 1957 on "Drill Pipe Protector" (now abandoned).

I claim:

1. A protective collar for drill pipe, comprising a tubular elastomeric body split longitudinally and openable at one side for application to the pipe, metallic gripping means within said body and exposable at its inside surface for engagement against the pipe to prevent displacement of the body along the pipe, said gripping means comprising a metallic band bonded to the inner portion of the body and carrying circularly distributed pipe engaging projections, said band terminating near the body split, and means for interconnecting the portions of the body and band at opposite sides of the split to thereby hold the body in circularly tensioned condition and maintain the gripping means pressed against the pipe surface, said projections being in the form of teeth capable of penetrating the pipe surface.

2. A protective collar for a well pipe comprising a tubular elastomeric body split longitudinally and openable at one side for application to the pipe, a pair of metallic joint sections at the sides of the body split and adapted to be forced circularly of the pipe together and into interlocking positions, and metallic means in essentially band form terminally connected to said sections and bonded to said body, said means including inwardly projecting teeth adapted to engage and penetrate the pipe surface upon circular tensioning of said metallic means.

3. A protective collar according to claim 2, in which said metallic means comprises a flexible band of which said teeth are integral projections.

4. A protective collar according to claim 2, in which said teeth are resiliently flexible radially of the pipe.

5. A protective collar according to claim 2, in which said teeth are distributed both circularly and longitudinally within the body.

6. A protective collar according to claim 2, in which said teeth are resiliently flexible and are circularly aligned in rows spaced axially of the body.

7. A protective collar according to claim 2, in which said teeth include one circular series thereof projecting angularly toward one end of the body, and a second circular series projecting angularly toward the opposite end of the body.

8. A protector collar for well pipe, comprising a split tubular elastomeric body adapted to be placed about a pipe, a relatively thin metallic band contained within said body and extending continuously between vertically offset and alignable looped terminals formed by doubling the band end extents upon themselves, and reinforcing means secured to the double portions of the band near said terminals, and engageable by a band tensioning tool to force together and align the loops inwardly of the reinforcing means.

9. A protector collar according to claim 8 in which said reinforcing means extend transversely of the band to correspondingly distribute thereto the tool-applied force.

10. A protector collar according to claim 8, in which said body extends circularly toward the loop terminals beyond said reinforcing means and contains openings through which the reinforcing means are accessible to the band tensioning tool.

11. A protector collar according to claim 10, in which said reinforcing means are in the form of cleats secured to the outsides of the doubled portions of the band.

References Cited in the file of this patent

UNITED STATES PATENTS

| | | |
|---|---|---|
| 1,298,619 | Wright | Mar. 25, 1919 |
| 1,889,059 | Dennie | Nov. 29, 1932 |
| 1,903,467 | MacClatchie | Apr. 11, 1933 |
| 1,907,012 | Smith | May 2, 1933 |
| 1,994,819 | Hartson | Mar. 19, 1935 |
| 2,197,531 | Smith | Apr. 16, 1940 |
| 2,286,716 | Clark | June 16, 1942 |
| 2,636,787 | Medearis | Apr. 28, 1953 |
| 2,855,052 | Wright | Oct. 7, 1958 |
| 2,887,771 | Holdeman | May 26, 1959 |
| 2,897,016 | Baker | July 28, 1959 |
| 2,959,453 | Jacobs | Nov. 8, 1960 |

FOREIGN PATENTS

| | | |
|---|---|---|
| 470,261 | Great Britain | Aug. 11, 1937 |